United States Patent [19]

Zyner

[11] Patent Number: 5,072,419

[45] Date of Patent: Dec. 10, 1991

[54] BINARY TREE MULTIPLIER CONSTRUCTED OF CARRY SAVE ADDERS HAVING AN AREA EFFICIENT FLOOR PLAN

[75] Inventor: Grzegorz B. Zyner, Sunnyvale, Calif.

[73] Assignee: Sun Microsystems, Inc., Mountain View, Calif.

[21] Appl. No.: 616,569

[22] Filed: Nov. 21, 1990

[51] Int. Cl.$^5$ .................................................. G06F 7/52
[52] U.S. Cl. .................................................... 364/757
[58] Field of Search ............... 364/757, 758, 754, 784, 364/786

[56] References Cited

U.S. PATENT DOCUMENTS

| | | | |
|---|---|---|---|
| 4,130,877 | 12/1978 | Riekers | 364/758 |
| 4,752,905 | 6/1988 | Nakagawa et al. | 364/757 |
| 4,979,018 | 12/1990 | Tanaka | 364/786 |

OTHER PUBLICATIONS

C. Stearns et al., "Yet Another Multiplier Architecture", Proceedings of the IEEE 1990 Custom Integrated Circuits Conference, May 13-16, 1990, pp. 24.6.1-24.6.4.

Primary Examiner—Gary V. Harkcom
Assistant Examiner—Long T. Nguyen
Attorney, Agent, or Firm—Blakely, Sokoloff, Taylor & Zafman

[57] ABSTRACT

A binary integer multiplier including a plurality of adder stages, each of such adder stages including a plurality of cells equal to a number of bits in an operand, each of such adder stage including a pair of full adders capable of receiving six input bits and producing two result bits at the significance level of the cell and two carry bits at the next higher significance level, apparatus interconnecting the bits indicating partial products to the input terminals of a cell at each significance level, apparatus interconnecting the carry output terminals of a cell to input terminals of the cell at the next significance level, apparatus interconnecting one carry output terminal of a cell to any unused input terminal at a cell of a particular stage at which only three input signals are provided, and apparatus interconnecting the result terminals of each cell to the input terminals of the cell at the same significance level at the next adder level.

7 Claims, 5 Drawing Sheets

PRIOR ART

PRIOR ART

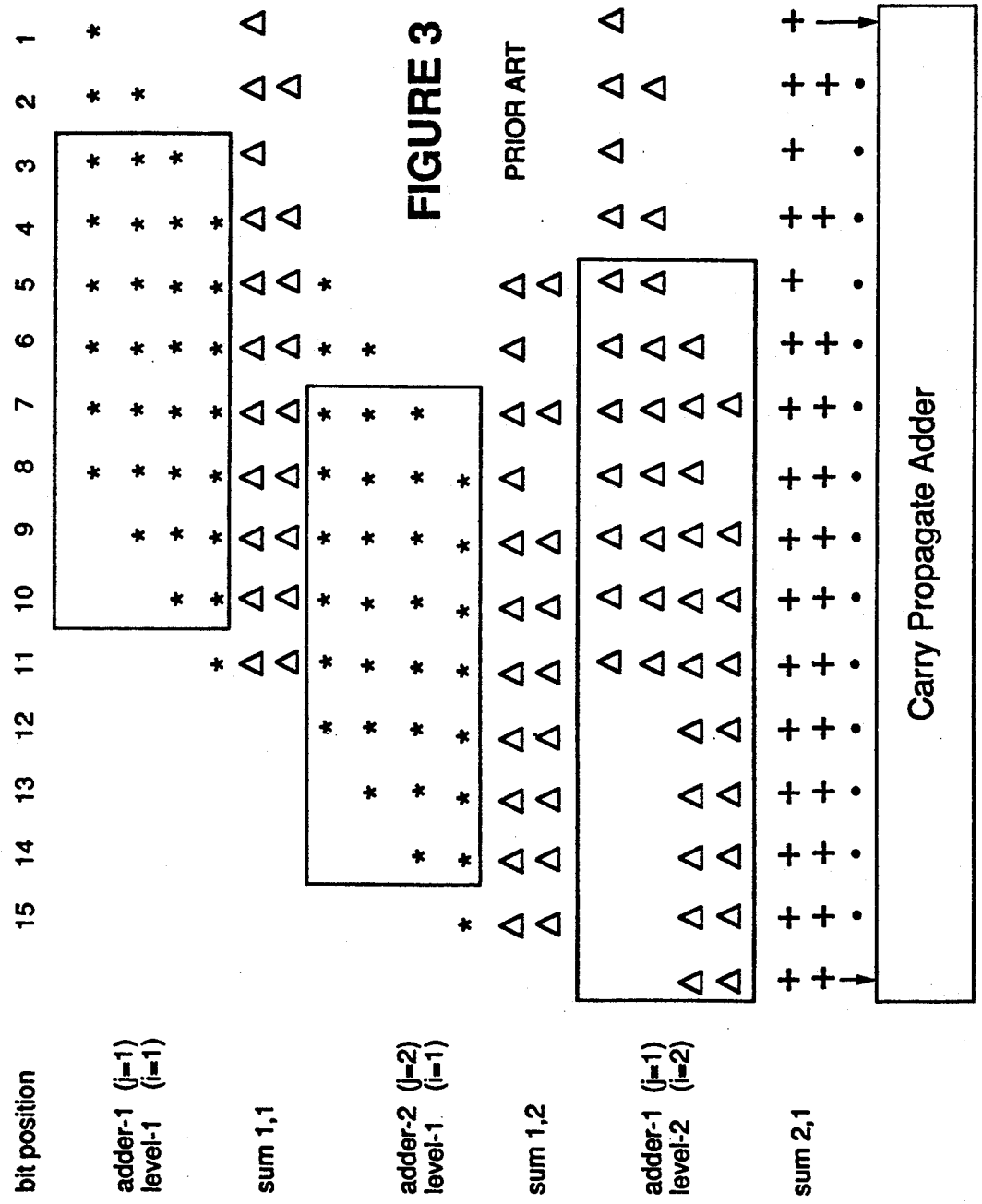

BINARY TREE MULTIPLIER CONSTRUCTED OF CARRY SAVE ADDERS HAVING AN AREA EFFICIENT FLOOR PLAN

BACKGROUND OF THE INVENTION

1. Field of the Invention

This invention relates to multiplier circuits and, more particularly, to methods and apparatus for constructing multipliers using carry save adders having an area efficient floor plan.

2. History of the Prior Art

Various arrangements for providing fast multiplying circuits for use in computers have been proposed. In general, these circuits may be used in either integer multiplication or in generating the mantissa in floating point multiplication. In the most basic case, the product of two n-bit binary operands is realized by determining a number of partial products each of which is offset by one bit to the left from the preceding partial product and then summing those partial products to reach a result.

In order to rapidly sum the partial products in this basic case, each of the individual columns of bits is summed individually in parallel with all others to produce a result which is a sum and a carry. However, binary adder stages are in general capable of handling only two inputs at a time so it takes some time to add each individual column. In order to reduce the time, a tree arrangement has been suggested in which the individual partial products are grouped in pairs and the groups summed in parallel by carry-save adders. These adders use as inputs carries from preceding stages so that even though the computations are carried out in parallel, the addition of each two bits of the partial product in a column requires sufficient time for the carry from the preceding stage to propagate. The results of the summations of these partial products are again grouped in pairs and the groups summed in parallel in the same manner by additional carry-save adders. This process continues until the last two partial products are summed to produce a product. High Speed Multiplier Using a Redundant Binary Adder Tree, Harata et al, IEEE Journal of Solid-State Circuits, Vol SC-22, No. 1, February 1987, describes such a circuit.

The circuits described in the above-mentioned article, although efficient in accomplishing their operations, are inefficient in the use of silicon. This is because the adders at different levels of addend summation are of unequal length, the lengths of the adders at higher levels being longer. When the length of the adders varies, the silicon occupied by the multiplier circuits varies radically over the area of the circuitry. Consequently, a great deal of the silicon area is wasted. In an attempt to produce the most regular implementation possible, it has been proposed by Vuillemin and Luk in an article entitled "Recursive Implementation of Optimal Time VLSI Integer Multipliers," published in VSLI '83, by Elsevier Science Publishers B.V., (hereinafter referred to as Vuillemin) to use individual adders which include two full adder circuits arranged to sum four separate inputs and a carry from the previous stage and to carry forward another carry from the previous stage to produce a pair of results and a pair of carries from each stage. Four individual partial products may be summed simultaneously using these four input adders, and the number of individual adders at all levels of addend summation may be made to have an equal length of 2n bits. Although this produces a regular area for the circuitry, the amount of area used is still much larger than is necessary for the operation, resulting in a large waste of silicon space and enlarging the chip needed to carry the circuitry.

SUMMARY OF THE INVENTION

It is, therefore, an object of the present invention to provide improved fast multiplying circuits for use in computers.

It is another more specific object of the present invention to provide improved fast multiplying circuits which make more efficient use of the silicon available and are regular in shape.

These and other objects of the present invention are realized in a binary integer multiplier comprising a plurality of adder levels, each of such adder levels comprising a plurality of adder cells equal to a number of bits in an operand, each of the stages of such adder levels comprising a pair of full adders capable of receiving six input bits and producing two result bits at the significance stage of the cell and two carry bits at the next higher significance stage, means interconnecting the bits indicating partial products to the input terminals of a cell at each significance stage, means interconnecting the carry output terminals of a cell to input terminals of the cell at the next higher significance stage, means interconnecting one carry output terminal of a cell to any unused input terminal at a cell of a next higher stage at which only three input signals are provided, and means interconnecting the result terminals of each cell to the input terminals of the cell at the same significance stage at the next adder level.

These and other objects and features of the invention will be better understood by reference to the detailed description which follows taken together with the drawings in which like elements are referred to by like designations throughout the several views.

BRIEF DESCRIPTION OF THE DRAWINGS

FIG. 1 is an illustration of a conventional paper and pencil method of multiplying two binary numbers.

FIG. 3 is an illustration of a prior art arrangement for multiplying two binary numbers.

NOTATION AND NOMENCLATURE

Figure 2:
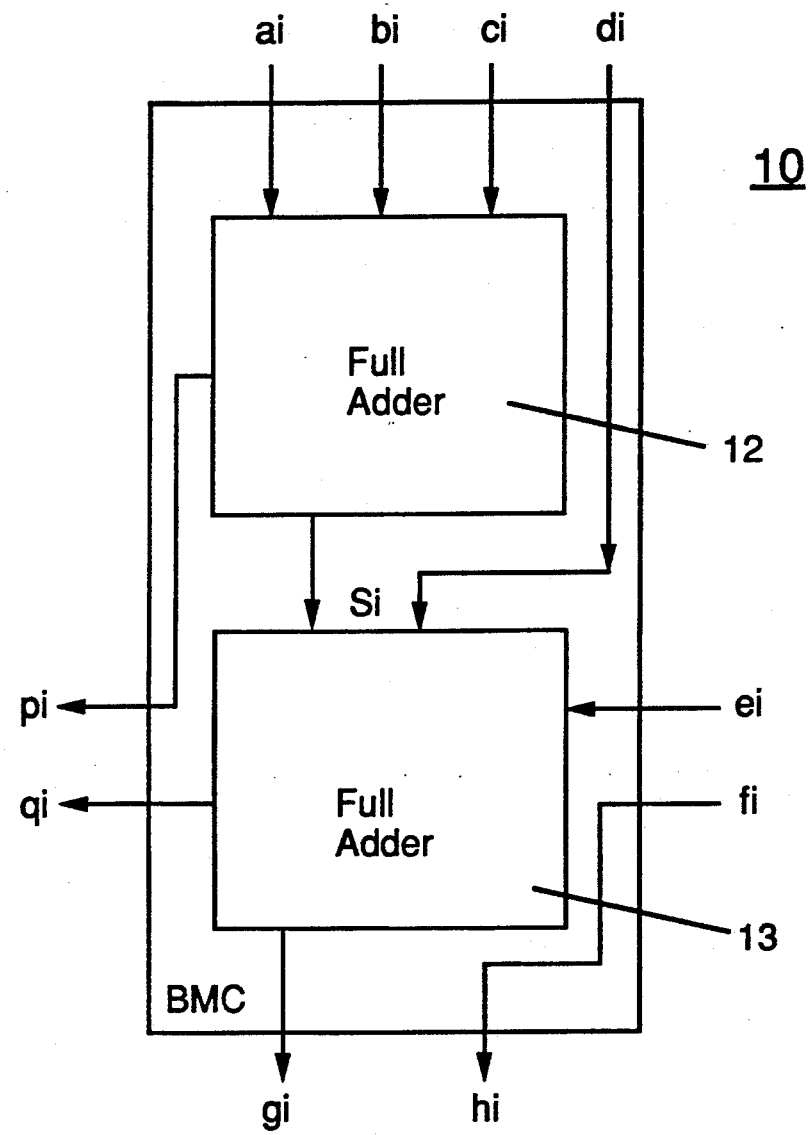
FIG. 2 is an illustration of a single cell of adder circuits used in the multiplication of two binary numbers by the prior art.

Some portions of the detailed descriptions which follow are presented in terms of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to apparatus for operating a computer in processing electrical or other (e.g. mechanical, chemical) physical signals to generate other desired physical signals.

DETAILED DESCRIPTION OF THE INVENTION

Figure 1:
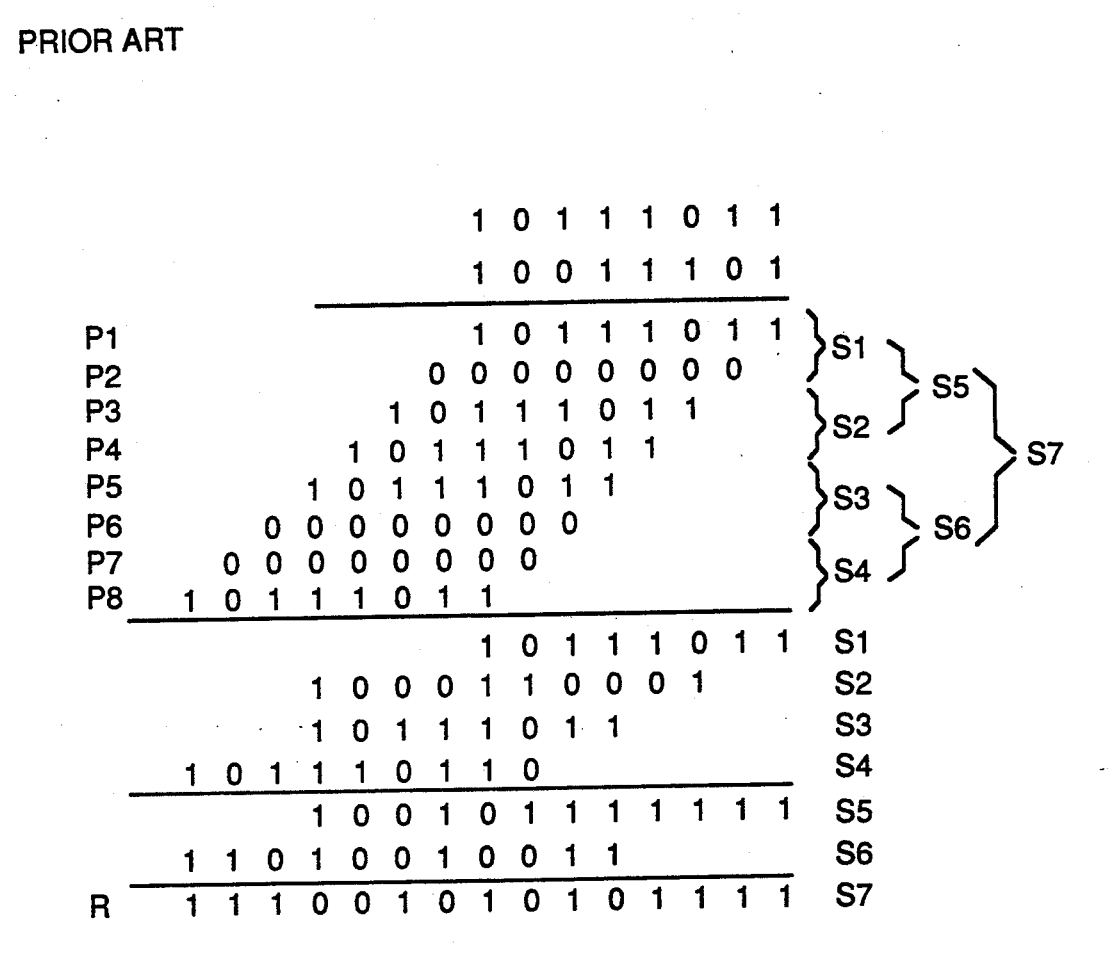

FIG. 1 illustrates the conventional "paper and pencil" method of multiplying two n-bit binary numbers. The multiplicand is multiplied by each bit of the multiplier in increasing significance to produce a series of partial products. Each partial product (labelled p1–p8 in the figure) in sequence is shifted to the left by one bit position from the preceding partial product to indicate the significance of the bits of the multiplier generating the particular partial product. Each of the columns of bits is then added to give a result and a carry for the column (not shown in the Figure). When this is done by hand, each carry is immediately added to the next column to produce another result and a carry until a final result (R) is reached. Using this method, the time to accomplish the addition of the columns is at least equal to the number of columns involved. However, digital computer circuits are generally capable of assuming only two states. Consequently, the addition of a large column of ones requires a number of individual additions and takes a substantial amount of time.

Moreover, in addition to the delay in adding the bits of any column, the result of the addition of the column using this paper and pencil method generates both a result of the same significance as the column and one or more carries. The addition of a column thus requires a wait for the result of the carries from the column of the next lowest order before providing a result. To speed this operation, a computer may add all of the columns in parallel to produce for each column a result and any carries. The carries are added to the final result and propagate forward from the lowest to the highest order until all of the carries have been propagated and added to produce a final result. Since the columns are added in parallel, the time to add an individual column and the number of additions required to include the carries determines the time required for the operation.

In order to reduce the time required for adding the individual columns and the overall time of the operation still further, various investigators have proposed the use of trees of adders which sum pairs (S1–S4) partial products (using carry save adders), then the results of those summations in pairs (S5, S6), and the results of those summations in pairs until a final result (S7) is reached using a carry propagate adder. Conceptually, this is essentially an operation which adds each two adjoining bits in a column in parallel with the other pairs of bits in the column. The steps of the process are illustrated to the right in FIG. 1.

To further speed this operation, Vuillemin has proposed the use of a (4:2) adder cell as a basic multiplier cell. FIG. 2 is a block diagram of such a cell 10. The cell 10 includes a pair of full adders 12 and 13. The adder 12 is furnished three inputs ai, bi, and ci. The adder 12 produces a result si and a carry pi. The adder 13 receives another input di, the result si of the three inputs to the adder 12, and an input ei. The inuts ai, bi, ci, and di are partial product bits. The input ei is a carry from the previous stage adder. The adder 13 produces a result gi and a carry output qi. The carry outputs pi and qi may be furnished as input to the next highest stage. The cell also receives a carry input fi from the preceding stage which is simply routed as a second output hi to the next level of summation in the tree. Essentially, the basic multiplier cell takes six inputs at the stage of the cell and produces two outputs at the adder stage of the cell (gi and hi) and two outputs at the next highest adder stage (pi and qi).

This basic multiplier cell may be used to sum four partial products at one time. First level adders using the basic multiplier cell produce results which are also added four at a time by basic multiplier cells of second level adder circuits. Ultimately, the pair of results are summed by a carry propagate adder to produce the desired result of the multiplication.

FIG. 3 is an illustration of the various levels of a multiplier proposed by Vuillemin using the basic multiplier cell in the arrangement described above. The multiplier illustrated is used for multiplying two eight bit binary numbers. Since two eight bit binary numbers are multiplied, eight partial products must be summed. This requires two rows of first level adders and one second level added raw. In the diagram, stars are used to illustrate individual bits of first level partial products, and deltas are used for each first level adder to indicate in an upper row whether a result gi is generated and in a lower row whether a carry hi is propagated from a preceding stage. The results and carries indicated by deltas at the adders of the first level are then summed in a second adder (again indicated by deltas), and the results (upper row) and carries (lower row) from that second level are represented by plus signs. Finally, the results and carries from the second level adder are summed in a carry propagate adder. Moreover, in order to regularize the space used Vuillemin has suggested individual adders at all levels be of the same length 2n (where n is the number of bits in a multiplier or multiplicand).

Although such an adder operates very rapidly, it will be seen from FIG. 3 that it does not make optimum use of the space it occupies on the silicon. In other words, the silicon area includes a substantial amount of wasted space. Most of this waste of space is brought about by the elongating of the result with each summation of the pairs of partial products. As may be seen in FIG. 3, for eight bit operands, the final summation requires that sixteen bit positions be provided. Consequently, the adder stages continue to extend to the left in FIG. 3 as the adder levels near the final result. The same is true of the area on silicon occupied by the adders. While the first level adders which sum the lower level partial products require only nine bit positions, those which provide the final summation require sixteen bits.

FIG. 3 also illustrates that a number of the positions in the matrix made up by the cells 10 in the prior art Vuillemin arrangement are not fully utilized. This is at least a portion of the waste of silicon produced by the prior art arrangements. For example, when the second level addition of the results and carries of previous partial products is accomplished, it is seen that the most significant bits of the two lower addends are shifted by four bit positions with respect to the two upper addends. When these four addends are aligned it is seen that a number of adder stages have less than four inputs from the addends of that stage. For example, bit positions one and three have only a single input, bit positions two, four, and twelve upward have only two inputs, and bit positions five and seven have only three inputs.

The present invention utilizes the fact that less than full utilization is made of the inputs at each adder stage of the basic multiplier cells to reduce the number of basic multiplier cells necessary and thus reduce the overall size of the adder circuit used without reducing the speed of operation of the multiplier. As in the multiplier proposed by Vuillemin, the present invention sums four partial producs at one time using basic multiplier cells. As may be seen in FIG. 3, there are only one input at bit 1 and two inpus at bit 2 to the first adder row at level one. Consequently, these inputs need not be sent through basic multiplier cells; they may be directly connected to the input terminals for bits 1 and 2 at a final carry propagate adder. The same is true of bits 5 and 6 of the second adder row at the first level. These inputs need not be sent through basic multiplier cells; they may be directly connected to the input terminals for bits 5 and 6 at the second level adder. In a like manner, bit position 11 of the first adder row and bit position 15 of the second adder row on the first level have a single input and receive a single carry; bit position 11 may be directly connected to the input terminals for bits 11 at the next level and bit position 15 may be directly connected to the input terminals for bits 15 at the final level carry propagate adder. This reduces the number of basic multiplier cells at each adder of the first level by three so that only eight are required.

Moreover, it will be seen that at the second level adder there are two inputs at most in the bit positions three and four since only the results from the first adder of level one are provided to these bits. Thus, the basic multiplier cells for these positions in the second level adder may be eliminated in the present invention, and the inputs for those stage are simply connected as inputs to the final stage carry propagate adder. This eliminates four stages of bacic multiplier cells from the second level adder.

Figure 4A:
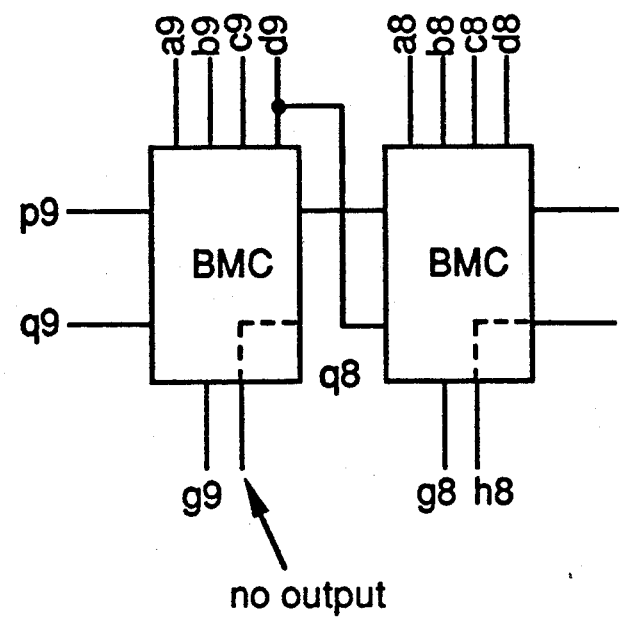
FIGS. 4a and 4b are illustrations of a single cell of adder circuits connected as used in the invention.

In addition to the simple step by which the first stages of the adders on each level are eliminated, there is some additional interconnection complexity involved in further reducing the number of cells to provide the arrangement of the invention. For example, in bit position 9 of the first adder row on the first level of adders, only three partial product inputs are available. If the carry input q8 from the previous stage 8 which is normally placed at terminal f9 to the stage 9 adder is placed on this unused terminal d9, then no output will appear on result terminal h9 of stage 9. A diagram of this connection is illustrated in FIG. 4(a). The same is true at bit position 13 of the second adder row on the first level. If the carry input f13 from stage 12 is routed to input d13, no output will appear on result terminal h13 of stage 13. Consequently each of these stages will produce only a single result output.

Figure 5:
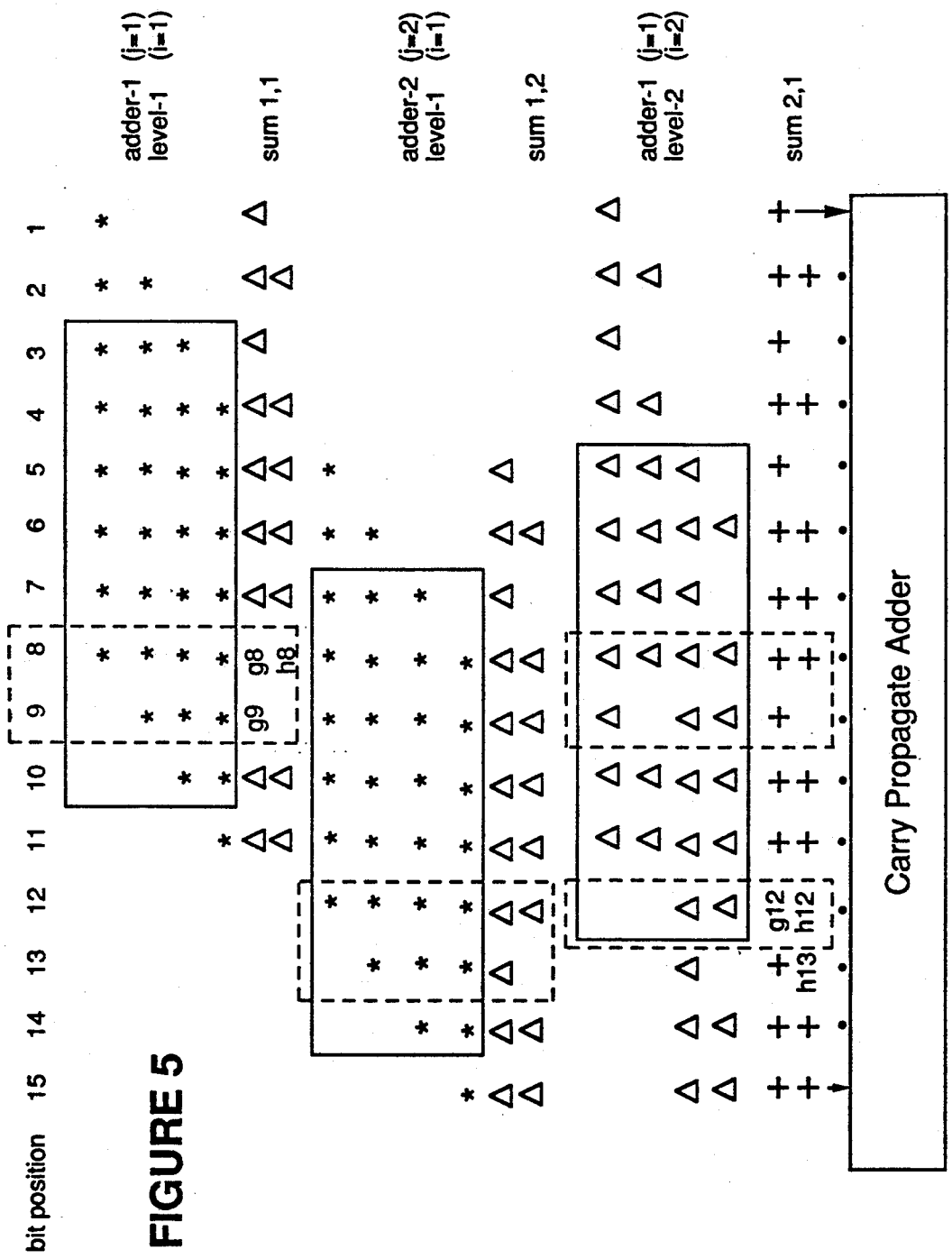
FIG. 5 is an illustration of a multiplier arrangement in accordance with the present invention.

The same proves true at each of the higher levels of summation. FIG. 5 illustrates an arrangement in accordance with the present invention in which the basic multiplier cells of a multiplier for multiplying eight bit numbers are modified as suggested above. When the results accomplished by the modification of the first level adders are applied to the next level of adders, it is found that only three inputs are available at the basic multiplier cell in bit position 9 of the second level adder. Consequently, the same modification to transfer the input normally placed at terminal f9 to the stage 9 at the second level of adder may be made so that no output will appear on terminal h9 of this stage. Although this has no effect in an eight bit multiplier, it would have an effect in a sixteen bit multiplier. In this manner, the cells of each level may be modified to reduce the number of input signals to a next level of adder circuits and thereby shorten the length of the adder circuit.

Figure 4B:
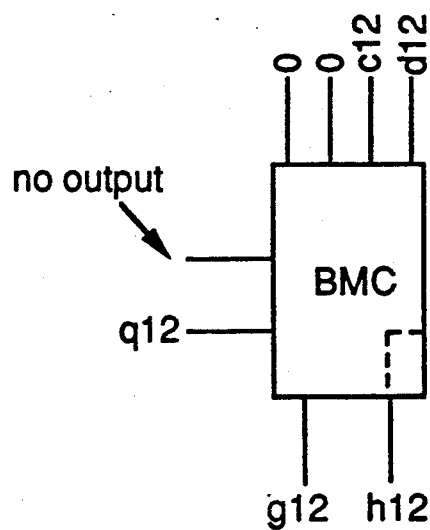

It will be seen that at the second level of adders, because of the modification of stage 13 of the second adder row on level one, only a single input is provided to that stage. Moreover, there are only two inputs to the stage 12 adder at level two. If the two inputs to stage 12 are connected to the terminals c12 and d12 (as shown in FIG. 4(b)), then the carry output p12 to the next stage 13 will always be zero. With only one carry to stage 13 and a single input from second adder row on level one, there is no need for a basic multiplier cell at stage 13 of level two. These may be carried directly to the final carry propagate adder. Moreover, since stages 14 and 15 have only two inputs, no basic multiplier cell is required to sum these bits. These too may be carried directly to the final carry propagate adder. Consequently, it may be seen that only stages 5 through 12 at level two actually require basic multiplier cells. This is the same number of cells as are required for the first level adders and the same number as the bits in a multiplier.

The same argument applies to each other stage which might be required for a particular multiplier circuit. At no level is it necessary to have more than n bits of basic multiplier cells for accomplishing the necessary addition. Consequently, the overall floor plan may be reduced to a regularized array with each adder having only cells sufficient for n bits. In general, this provides approximately 25% more available space on the silicon on which the multiplier is constructed. Consequently, by applying these techniques to the circuitry, adders of no more than the number of bits in the multipliers are required. Thus, the invention provides circuitry which utilizes significantly less silicon to produce the same result as the circuits of the prior art.

Of particular note is the fact that the invention provides the result without requiring any additional time to produce the result. It is a fact that the rewiring required to accomplish the reduction in size of the circuitry causes an additional full carry adder delay at stages 9 through 11 on level one and at stages 13 through 15 of level two. However, the final level adder outputs at these stages do not provide inputs to additional cells but to the carry propagate adder. Since the stages which are delayed are the last to be affected in the carry propagate adder, the execution of the adder stages at the previous levels in parallel should provide the requisite outputs at those late stages of the carry propagate adderwell before the earlier stages have completed their carries. Consequently, in almost all cases the circuits of the present inventing will operate as fast as the circuits of the prior art. In fact, it has been determined that for a thirty-two by thirty-two bit matrix of adders, only one gate delay overall is introduced.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A binary integer multiplier for multiplying two operands which generate a plurality of partial product bits the binary integer multiplier comprising:

a plurality of adder stages, each of such adder stages comprising a plurality of multiplier cells, the multiplier cells being organized in at least one adder row such that one adder row includes no more than one multiplier cell for each adder stage and the number of cells in each adder row being equal to the number of bits in an operand, the adder rows are organized in at least one adder level such that all multiplier cells in an equivalent adder stage and an equivalent adder level perform operations in parallel, each of such multiplier cells comprising:

a first full adder and a second full adder, four result input terminals capable of receiving four result input bits, two carry input terminals capable of receiving two carry input bits, and two result output terminals capable of producing two result bits at an adder stage equal to the adder stage of the corresponding multiplier cell and, two carry output terminals capable of producing two carry bits at an adder stage one greater than the adder stage of the corresponding multiplier cell;

means connecting the partial product bits to the result input terminals of each multiplier cell in a first adder level, means connecting the carry output terminals of each cell to the carry input terminals of a cell at an adder stage one greater than the adder stage of the multiplier cell and in an equivalent adder row;

means connecting a carry output terminal of a cell to any unused result input terminal of a cell in an adder stage one greater than the adder stage of the carry output terminal in which only three input signals are provided; and means connecting the result output terminals of each cell to the result input terminals of a cell at an equivalent adder stage and at an adder level one greater.

2. A binary integer multiplier as claimed in claim 1 further comprising means for connecting result input terminals of a multiplier cell having only two result input bits to the result input terminals of the multiplier cell such that one bit is received by the first full adder and the second bit is received by the second full adder whereby only a single carry is produced from the multiplier cell.

3. A binary integer multiplier as claimed in claim 1 further comprising connection means for providing inputs directly to a summing means for generating a final product if the inputs consist of two or less partial product bits, or one result bit and no carry bit, or one result bit and one carry provided a previous adder stage does not generate an output carry bit, whereby the connection means reduces additional multiplier cells.

4. A binary integer multiplier as claimed in claim 3 wherein the summing means for generating a product by summing the result and carry bits from each adders stage in a final level comprises a carry propagate adder.

5. A binary integer multiplier for multiplying two operands which generate a plurality of partial product bits, the binary integer multiplier comprising:

a plurality of adder stages, each of such adder stages comprising a plurality of multiplier cells, the multiplier cells being organized in at least one adder row such that one adder row includes no more than one multiplier cell for each adder stage and the number of cells in each adder row being equal to the number of bits in an operand, the adder rows are organized in at least one adder level such that all multiplier cells in an equivalent adder stage and an equivalent adder level perform operations in parallel, each of such multiplier cells comprising:

a first full adder and a second full adder, four result input terminals capable of receiving four result input bits, two carry input terminals capable of receiving two carry input bits, and two result output terminals capable of producing two result bits at an adder stage equal to the adder stage of the corresponding multiplier cell and, two carry output terminals capable of producing two carry bits at an adder stage one greater than the adder stage of the corresponding multiplier cell;

means connecting the partial product bits to the result input terminals of each multiplier cell in a first adder level, means connecting the carry output terminals of each cell to the carry input terminals of a cell at an adder stage one greater than the adder stage of the multiplier cell and in an equivalent adder row;

summing means for generating a product by summing the result and carry bits from each adders stage in a final level;

means for providing inputs directly to the summing means for generating a final product if the inputs consist of two or less partial product bits, or one result bit and no carry bit, or one result bit and one carry bit provided a previous adder stage generates only one output carry bit;

means connecting any bit from any terminal consisting of two or less partial product bits or two or less output result bits and output carry bits directly to the summing means; and means connecting the result output terminals of each cell to the result input terminals of a cell at an equivalent adder stage and at an adder level one greater.

6. A binary integer multiplier as claimed in claim 5 wherein the summing means for generating a product by summing the result and carry bits from each adders stage in a final level comprises a carry propagate adder.

7. A binar integer multiplier as claimed in claim 5 further comprising means connecting a carry output terminal of a cell to any unused result input terminal of a cell in an adder stage one greater than the adder stage of the carry output terminal in which only three input signals are provided.

* * * * *